United States Patent
Gerhards et al.

(10) Patent No.: US 8,434,770 B2
(45) Date of Patent: May 7, 2013

(54) TRANSVERSE LINK ON A MOTOR VEHICLE (75) Inventors: Thomas Gerhards, Niederzier (DE); Michael Johannes Franzten, Aachen (DE); Marc Simon, Cologne (DE); Wolfgang David, Aachen (DE); Martina Beyer, Pulheim (DE); Karsten Sander, Pulheim (DE); Frank Scheper, Loningen (DE); Karsten Klostermeier, Hille (DE); Jen Wohlers, Lemforde (DE); Andreas Rodenberg, Diepenau Essern (DE)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 13/146,557

(22) PCT Filed: Jan. 15, 2010

(86) PCT No.: PCT/DE2010/000032
§ 371 (c)(1),
(2), (4) Date: Jul. 27, 2011

(87) PCT Pub. No.: WO2010/085934
PCT Pub. Date: Aug. 5, 2010

(65) Prior Publication Data
US 2012/0091681 A1    Apr. 19, 2012

(30) Foreign Application Priority Data
Jan. 28, 2009  (DE) .......................... 10 2009 006 356

(51) Int. Cl.
*B60G 7/02*    (2006.01)
*F16F 1/52*    (2006.01)
*F16F 13/14*    (2006.01)

(52) U.S. Cl.
USPC ............ 280/124.125; 267/140.5; 267/140.11; 267/141.3; 280/124.134

(58) Field of Classification Search ........... 280/124.125, 280/124.134, 124.135, 124.136, 124.138; 267/140.11, 140.12, 140.5, 141, 141.1, 141.2, 267/141.3
See application file for complete search history.

(56) References Cited

U.S. PATENT DOCUMENTS

| | | | | |
|---|---|---|---|---|
| 4,415,178 A | * | 11/1983 | Hatsushi et al. ....... | 280/124.145 |
| 4,883,260 A | * | 11/1989 | Kanda ...................... | 267/140.12 |
| 5,692,767 A | * | 12/1997 | Kato ....................... | 280/124.142 |
| 6,572,126 B2 | * | 6/2003 | Tunzini ................... | 280/124.134 |
| 2004/0084601 A1 | | 5/2004 | Kato | |
| 2009/0179360 A1 | * | 7/2009 | Quinn et al. ............. | 267/140.11 |

FOREIGN PATENT DOCUMENTS

| | | |
|---|---|---|
| DE | 42 15 195 A1 | 11/1993 |
| DE | 198 41 805 A1 | 3/2000 |

(Continued)

*Primary Examiner* — Joseph Rocca
(74) *Attorney, Agent, or Firm* — LC Begin & Associates, PLLC (57) ABSTRACT

A transverse link (1) has a main body (2), which has at least one first fixing region (4) for pivotal attachment to a vehicle frame element. The first fixing region (4) has a journal (9) surrounded by a bearing bush (23). A stop region (19) is arranged proximate the first fixing region (4). The stop region is interrupted when viewed in the circumferential direction, resulting in the formation of diametrically opposite thickened portions (21, 22), which are arranged between the main body (2) and the journal (9) and are embodied in such a way that only forces acting in the lateral and vertical vehicle directions are absorbed when the main body (2) is twisted out of the neutral position thereof, about a vertical axis (Y) of a second fixing region (3).

13 Claims, 4 Drawing Sheets

FOREIGN PATENT DOCUMENTS

| | | |
|---|---|---|
| DE | 200 04 149 U1 | 5/2000 |
| DE | 101 14 466 A1 | 9/2002 |
| DE | 102 57 221 A1 | 6/2004 |
| DE | 103 11 211 A1 | 9/2004 |
| DE | 103 38 627 A1 | 3/2005 |
| DE | 10 2004 009 724 A1 | 9/2005 |
| DE | 10 2007 018 569 A1 | 10/2008 |
| EP | 1 055 534 A3 | 11/2000 |

* cited by examiner

TRANSVERSE LINK ON A MOTOR VEHICLE

The invention relates to a transverse link having a main body, which has at least one first fixing region for pivotal attachment to a vehicle frame element, the first fixing region having a journal, which is surrounded by a bearing bush.

DE 200 04 149 U1 discloses a bearing arrangement with transverse flexibility or a link in a wheel suspension, comprising an outer bush and a bearing pin which, when inserted one inside the other, form an annular space and can be moved elastically relative to one another in the radial direction, and a first elastomer body, which is arranged in the annular space and has a stop surface which extends over a section of the circumference and which provides radial support for the bearing pin on the outer bush. In order to provide a bearing arrangement with transverse flexibility. DE 200 04 149 U1 proposes to arrange in the annular space a second elastomer body having a stop surface which extends at least in sections over the same section of the circumference and by means of which additional radial support is supposed to be provided for the bearing pin on the outer bush after contact with the first stop surface and an additional radial travel.

The abstract of JP 61-282106 A is concerned with a transverse link which has, on the main body thereof, raised webs that surround the latter, which are intended to increase the rigidity of at least one wheel limb.

DE 198 41 805 A1 relates to an A-arm for a motor vehicle for connecting a wheel axle pivotally to the vehicle frame. The A-arm has a longitudinal arm and a transverse arm. The A-arm consists of two interconnected parts, which are forged from aluminum, with connecting means being provided to connect the two parts. The A-arm has a journal, which can be inserted into a bearing bush.

DE 199 23 698 A1 discloses a transverse link which has a substantially T-shaped main body and which, on each of the end sections thereof, has a bearing location, by which a journal for accepting a hydraulic mount is formed. The transverse link is formed integrally from aluminum by the thixocasting process.

DE 42 15 195 A1 is concerned with flexible support for a support arm. A flexible element and a bearing bush are separate parts in order to allow reuse of the raw materials employed without special effort once their useful life has expired.

A transverse link can be embodied with three fixing regions (three-point link), a first and a second fixing region being connected to the vehicle frame element, and the other, that is to say the third, fixing region, being connected to a hub carrier via a journal connection. The first fixing region is embodied as a journal which can be inserted into a bearing bush, it being possible to connect the bearing bush to the vehicle frame element by means of suitable connecting elements. The second fixing region is embodied in the manner of a sleeve. In a neutral position, the three fixing regions are situated substantially in a common fixing plane. The transverse link absorbs braking forces and acceleration forces, for example, but can also be designed in such a way as to absorb irregularities in the road surface, such as potholes, bumps, vibration or the like.

It is the underlying object of the invention to improve a transverse link of the type stated at the outset by simple means in such a way that vehicle setup, for example, is easier.

According to the invention, the object is achieved by means of a transverse link in which a stop region is provided, which is interrupted when viewed in the circumferential direction, resulting in the formation of diametrically opposite, preferably concentrically constructed thickened portions, the thickened portions being arranged between the main body and the first fixing region and being embodied in such a way that only forces acting in the lateral and vertical directions are absorbed when the main body is twisted out of the neutral position thereof, about a vertical axis of a second fixing region, and the respective thickened portion strikes against corresponding stop elements of the bearing bush by means of the respective stop surface thereof.

The invention is based on the realization that a conventionally embodied transverse link is produced, in particular, from a light metal such as aluminum, the fixing regions thereof, of which there are three for example, being arranged substantially in a common fixing plane in an unmounted state or in a neutral mounted position. The transverse link is pivotally attached by its first and second fixing regions to a vehicle frame element, e.g. a subframe, and by its other, i.e. third, fixing region, is pivotally attached to a hub carrier, via journal connection for example. This known embodiment is used primarily to ensure that the transverse link overall is embodied with a view to weight savings (light metal), and transmission of forces in a straight line from the hub carrier to the subframe used as an example is achieved.

Admittedly, especially with transverse links made from a light metal, it has been observed that, in comparison with transverse links made of steel, said transverse links had to be given a larger cross section, especially in the first fixing region thereof, i.e. at the journal thereof, for reasons of strength in order to withstand the loads encountered. However, this is very disadvantageous for reasons of installation space since the journal of enlarged cross section, together with the bearing bush, requires a correspondingly large amount of installation space. The first and second fixing regions are each designed in such a way that forces both in the axial direction and in the lateral and vertical directions are absorbed by both bearing locations, and it is possible to select a vehicle setup by means of the transverse link. For example, it is possible to give the driver of the vehicle a particular driving feel. Thus, the first and second fixing regions, in particular, can be designed in such a way that vehicle contact with the road surface is transmitted to the driver of the vehicle either with or without damping. However, since both fixing regions can absorb forces both in the axial direction and in the lateral and vertical directions, this results in certain compromises in respect of vehicle setup.

By means of the invention, in contrast, it is ensured that the first fixing region absorbs only forces acting in the lateral and vertical directions, and this advantageously facilitates adjustment in respect of the required stiffness, especially that of the bearing bush, i.e. vehicle setup, since this no longer has to be designed for possible absorption of axial forces. However, the journal too need now only be designed for these directions of force.

Axial forces in the sense according to the invention are forces which act along the longitudinal axis of the vehicle, while lateral forces in the sense according to the invention are forces which act transversely to the longitudinal axis of the vehicle.

It is expedient if the diametrically opposite thickened portions are arranged on side faces of the main body, making it possible for twisting about the vertical axis of the second fixing region to bring the respective thickened portion into contact with the corresponding stop element.

To ensure that forces have only to be absorbed in the lateral and vertical directions, provision is furthermore advantageously made for the stop surfaces of the respective thickened portion to be of cylindrical design. In contrast to a conical configuration of a stop surface, this advantageous configuration has the effect that the impinging force is not split into vectors, thus ensuring that only the force acting in the lateral and vertical directions acts on the thickened portion.

In a more preferred embodiment, provision can be made for the first fixing region to have a transitional region of conical design leading as a continuation from the stop region to the journal, but, owing to the advantageously arranged and embodied thickened portion, said transitional region preferably has no contact with the bearing bush when the transverse link is twisted about the vertical axis of the second fixing region.

The bearing bush is preferably designed as a hydraulic bush. Said bush has an inner tube which surrounds the bearing journal, with flexible elements being arranged in a known manner between the inner tube and the outer wall. In order then to ensure that the respective thickened portion can strike against the corresponding stop element in the case of a particular direction of rotation about the vertical axis of the second fixing region, provision is expediently made for the insertion end of the bearing bush to fit over the diametrically oppositely arranged thickened portions. A flexible element is advantageously arranged in each of these regions to form the stop element. Thus, in a manner corresponding to the diametrically opposite thickened portions, the stop element too is arranged only on a section of the circumference of the overlapping region, namely precisely where the respective thickened portion can make contact when the transverse link is twisted about the vertical axis of the second fixing region.

The bearing bush has the insertion end and a free end situated opposite the latter. It is advantageous according to the invention if the insertion end of the inner tube ends in a position ahead of the overlapping region in relation to the insertion end of the bearing bush, when viewed in the axial direction of the bearing bush, the opposite end of the inner tube preferably being extended to match the length of the outer tube. The respective end regions of the inner tube are arranged so as to extend at an angle to a central section of the inner tube, and this means that the inner tube tapers conically from the insertion end toward the central section, when viewed in longitudinal section, and widens conically from the central section toward the opposite end, when viewed in longitudinal section. The two opening angles are of approximately the same size but are opposed.

In a preferred embodiment, the transverse link is produced integrally from a light metal, e.g. aluminum, preferably being forged. The journal of the first fixing region is embodied with a polygonal cross section, preferably as a hexagon. The forging process furthermore results in a forging seam or forging burr, which is arranged on the side faces of the transverse link. To avoid contact between the forging seam or forging burr and the stop elements, provision is advantageously made to provide said stop elements with a recess matched to the position of the forging burr, thus forming a stop element which has as it were an undulating profile.

It is advantageous that the surface of the stop element is at a distance from the respective thickened portion in a neutral position, thus forming at least one air gap. Depending on the size of the air gap, it is thus possible to set a correspondingly earlier stop contact or a correspondingly later stop contact with respect to twisting of the transverse link about the vertical axis of the second fixing region. If the respective thickened portion strikes against the corresponding stop element, this is damped. A "soft" vehicle setup is thus achieved with early stop contact and a "hard" vehicle setup is thus achieved with late stop contact. The "soft" setup can be chosen, for example, for a vehicle, the target customer group of which wants a comfortable ride, i.e. a setting with which irregularities in the road surface, for example, are damped. The "hard" setup can be chosen, for example, for a vehicle, the target customer group of which always wants more direct feedback on current contact with the road surface, for example, i.e. a setting with which irregularities in the road surface, for example, are not damped to such an extent.

Of course, the size of the air gap can also be set by means of the respective thickened portion, i.e. the extent of the latter in the direction of the stop element.

The thickened portions, which are in each case situated diametrically opposite, are preferably arranged on side faces of the transverse link or main body, and it is also possible to refer to an inner and an outer thickened portion in relation to a longitudinal axis of the vehicle. In this arrangement, the inner thickened portion is arranged on that side of the transverse link which is oriented toward the longitudinal axis of the vehicle, and the outer thickened portion is arranged opposite thereto.

The invention provides an improved transverse link which absorbs only forces in the lateral and vertical directions owing especially to the advantageous embodiment with the laterally arranged, diametrically opposite thickened portions on the first fixing region thereof. Since, in the preferred embodiment as a hydraulic bush, the stiffness of the bearing bush interacting therewith has therefore also only to be designed for forces acting in the lateral and vertical directions, the embodiment obtained overall is advantageous inasmuch as it is also only necessary to allow for two force dimensions for vehicle setup. The vehicle setup can thus be adapted more finely to the requirements of the respective target customer. Thus, a physically acting stop element is as it were formed, the important point being that this stop element absorbs forces only in the lateral and vertical directions and not forces acting in the axial direction. These forces are absorbed by the second fixing region. This is also achieved by the very fact that the thickened portion is not conically shaped but cylindrically shaped. It is also advantageous that the thickened portion is not designed to run all the way around the circumference but is interrupted in the circumferential direction, with no thickened portions being provided on an upper and lower side of the transverse link, relative to the installation position of the latter. On the contrary, the upper and lower side are advantageously designed in such a way that contact between the main body and the bearing bush is avoided. The axial length of the overlapping region is advantageously designed in such a way that the thickened portions can strike against the stop elements since the transverse link or the first fixing region thereof twists relative to the bearing bush.

In addition, the physically acting stop element can advantageously be designed in such a way that it is embodied to match the action of a clip or aluminum clip arranged at the opposite end of the bearing bush from the insertion end in order to achieve corresponding damping properties.

Moreover, these advantageous measures enhance the service life and reduce fatigue both of the journal and of the bearing bush.

A transverse link in accordance with the prior art is illustrated in plan view in FIG. 1. Further advantageous embodiments of the invention are disclosed in the subclaims and in the following description of the figures. In the drawings:

In the various figures, identical parts are always provided with the same reference signs, for which reason said parts are also generally described only once.

Figure 1:
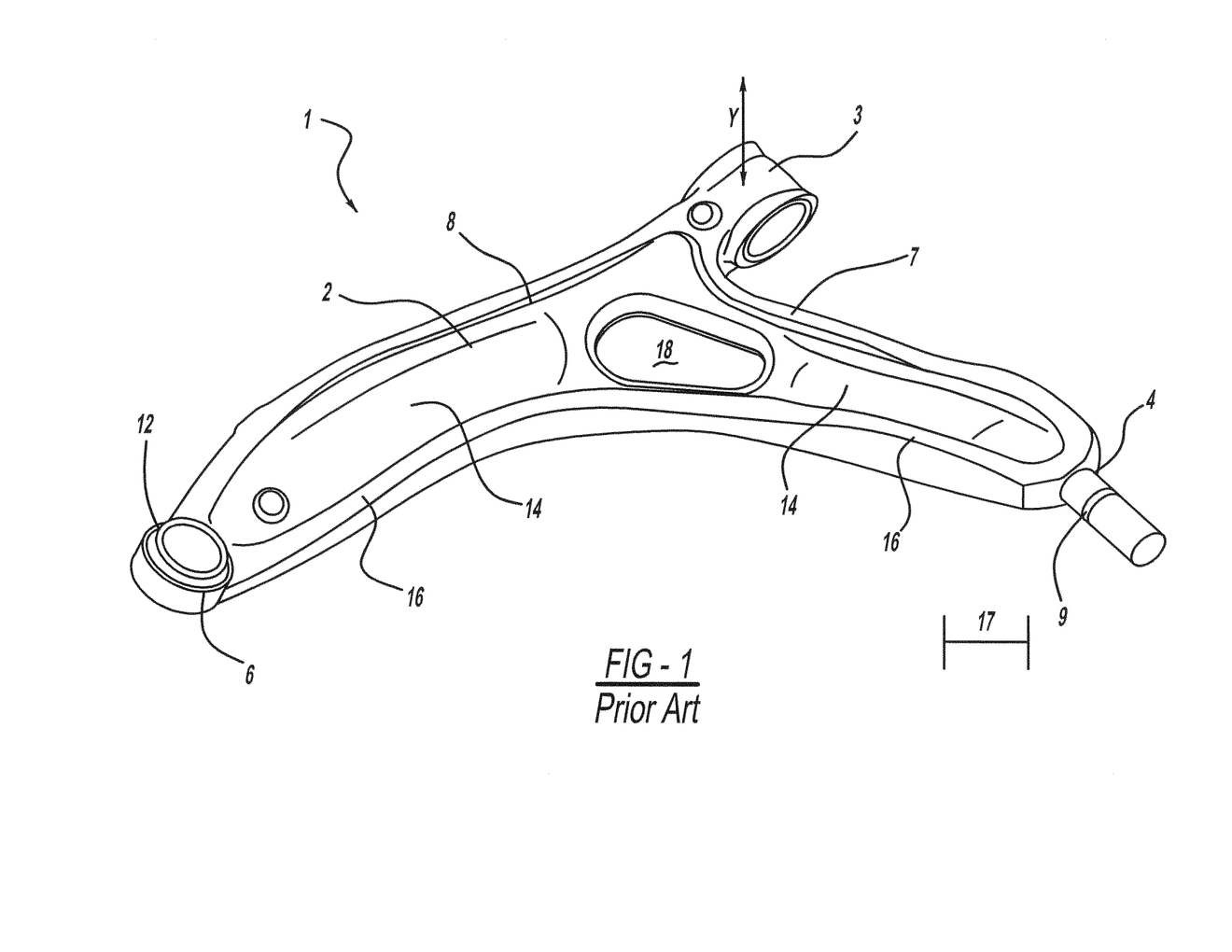

FIG. 1 shows the transverse link 1 in accordance with the prior art. The transverse link 1 has a main body 2, which has a first fixing region 4 and a second fixing region 3 for pivotal attachment to a vehicle frame element (not shown), e.g. to a subframe. The transverse link 1 furthermore has another, i.e. a third, fixing region 6 for pivotal attachment to a hub carrier (not shown). The main body 2 is substantially L-shaped, with a frame limb 7 and a wheel limb 8. The first and second fixing regions 3 and 4 are arranged on the frame limb 7. The second fixing region 3 is embodied in the manner of a sleeve, for example the first fixing region 4 being embodied as a journal 9 for example, which is surrounded by a bearing bush 11 (see FIGS. 3 to 5).

The third fixing region 6 is arranged on the wheel limb 8 and forms a socket 12 for a journal. By means of the journal, the transverse link 1 is pivotally attached to the wheel hub.

The main body 2 furthermore has a base 14, which is surrounded by raised webs 16, with the result that the main body 2 has an H-profile 17 when viewed in cross section.

In the uninstalled position illustrated in FIG. 1, the three fixing regions 3, 4 and 6 are arranged substantially in a plane of the main body 2. Moreover, the main body 2 has an aperture 18 in the base 14 thereof, for example.

As can furthermore be seen from FIG. 1, the base 14 and the raised webs 16 surrounding the latter are extended as far as the respective fixing regions 3, 4 and 6, and therefore the transverse link 1 allows transmission of forces in a straight line from the hub carrier to the vehicle frame element in the installed position.

Figure 2:
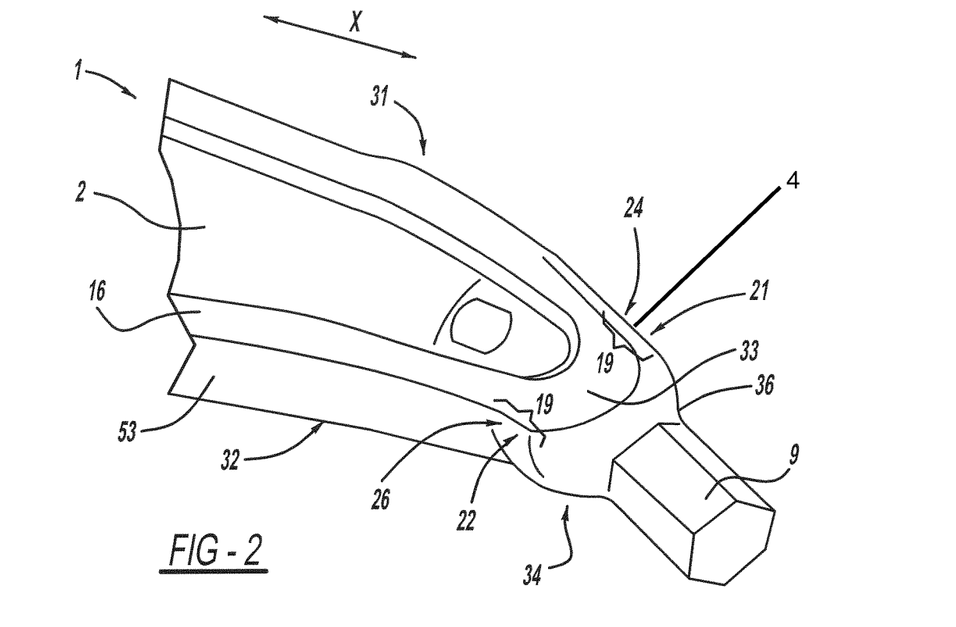
FIG. 2 shows a first fixing region of the transverse link as a detail.

FIG. 2 shows a detail of the transverse link 1, the first fixing region 4 of which is embodied in accordance with the invention. The journal 9 is embodied with a polygonal cross section, preferably as a hexagon.

The first fixing region 4 has a stop region 19, which is interrupted when viewed in the circumferential direction, resulting in the formation of two diametrically opposite thickened portions 21 and 22. The thickened portions 21 and 22 are arranged and embodied in such a way that only forces acting in the lateral and vertical directions are absorbed when the main body 2 is twisted out of a neutral position, about a vertical axis Y (FIG. 1) of the second fixing region 3, and the respective thickened portion 21 or 22 strikes against corresponding stop elements 27, 28 of the bearing bush 23 by means of the respective stop surface 24, 26 thereof.

The thickened portions 21 and 22 are each arranged on one side 31 and 32, respectively, preferably at the respective raised webs 16 of the main body 2, i.e. preferably in the common fixing plane of the three fixing regions 3, 4 and 6. In relation to a longitudinal axis X of the vehicle, side 31 can be referred to as inner side 31, and the opposite side 32 can be referred to as outer side 32, and therefore thickened portion 21 can be referred to as inner thickened portion 21 and thickened portion 22 can be referred to as outer thickened portion 22. The upper side 33 and the lower side 34 of the stop region 19, which are situated between the two sides 31 and 32, are embodied as flat surfaces without a thickened portion. The stop region 19 merges into the journal 9, a step-free transition 36, which is as it were of conical design, being shown here by way of example.

The respective stop surfaces 24 and 26 of the thickened portions 21 and 22 are of cylindrical design.

The bearing bush 23 (FIGS. 3 and 4) is embodied as a hydraulic bush, for example, and has an insertion end 37 and an end 38 situated opposite the latter. The bearing bush 23 has an outer shell 39, which is surrounded by a clamp 41. By means of the clamp 41, the first fixing region 4 is connected to the vehicle frame element. Arranged within the outer shell 39 is an inner tube 42, which has a central section 43 and respective end regions 44 and 46 adjoining the latter. Each of the respective end regions 44 and 46 is designed to widen conically, starting from the central section 43. The bearing bush 23 furthermore has conventional components of the hydraulic bush used as an example.

Figure 3:
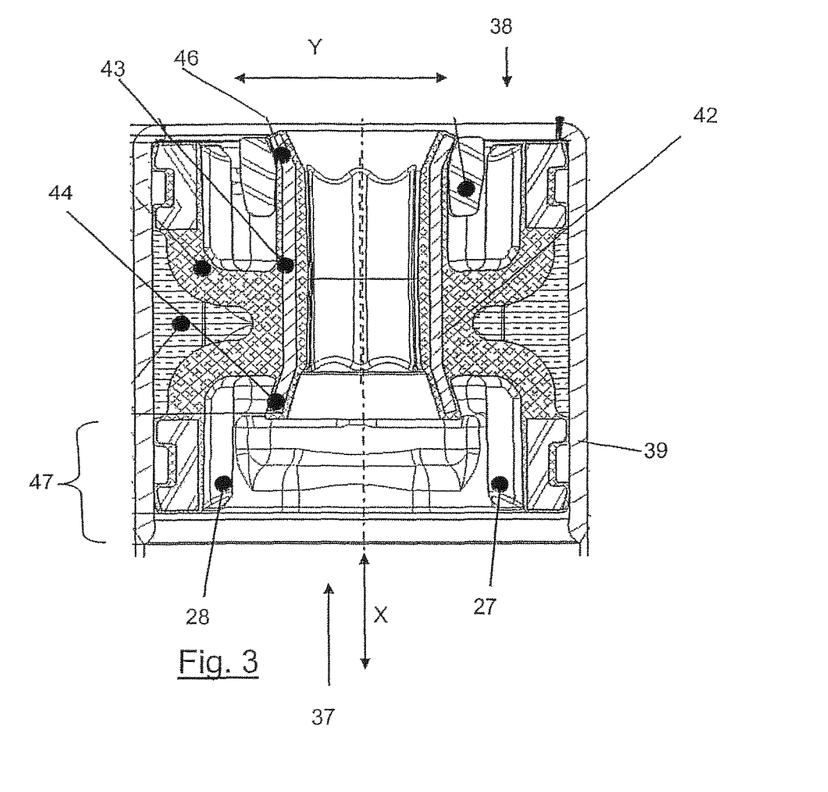
FIG. 3 shows a longitudinal section through a bearing bush.
Figure 4:
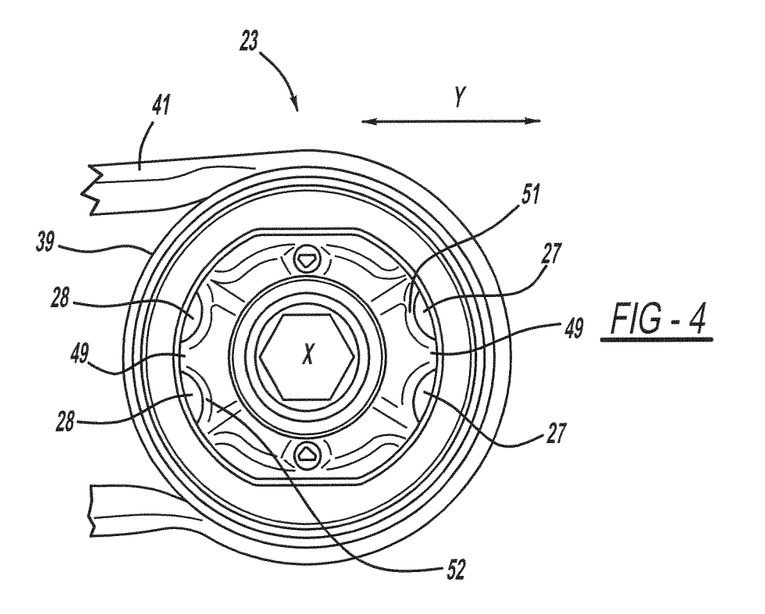
FIG. 4 shows a view of an insertion end of the bearing bush in FIG. 3.

An overlapping region 47, on which the stop elements 27 and 28 are arranged, is provided at the insertion end 37, said stops being embodied as elastomer bodies or hydraulically operating bodies. The stop elements 27 and 28 are arranged only on one section of the circumference, i.e. not all the way round the outer shell 39 in the circumferential direction, in a manner corresponding to the thickened portions 21 and 22, respectively. The stop elements 27 and 28 each have an approximately centrally situated recess 49, giving rise to the formation in each case of stop elements 27 and 28 with as it were an undulating stop surface 51. The zenith 52 of the peaks is oriented in the direction of a center line X of the bearing bush 23.

As can be seen in FIG. 2, the main body has a forging burr 53 on the sides 31 and 32 thereof. The recesses 49 in the stop elements 27 and 28 serve to ensure that the forging burr 53 has no contact with the latter when the respective thickened portions 21 and 22 strike against the stop elements 27 and 28.

As illustrated by way of example, the inner tube 42 is accommodated with its end region 44 facing the insertion end 37 ending within the outer shell 39, the end region 44 ending before the overlapping region 47. The opposite end region 46 of the inner tube 42 ends approximately at the level of the outer shell 39.

Figure 5:
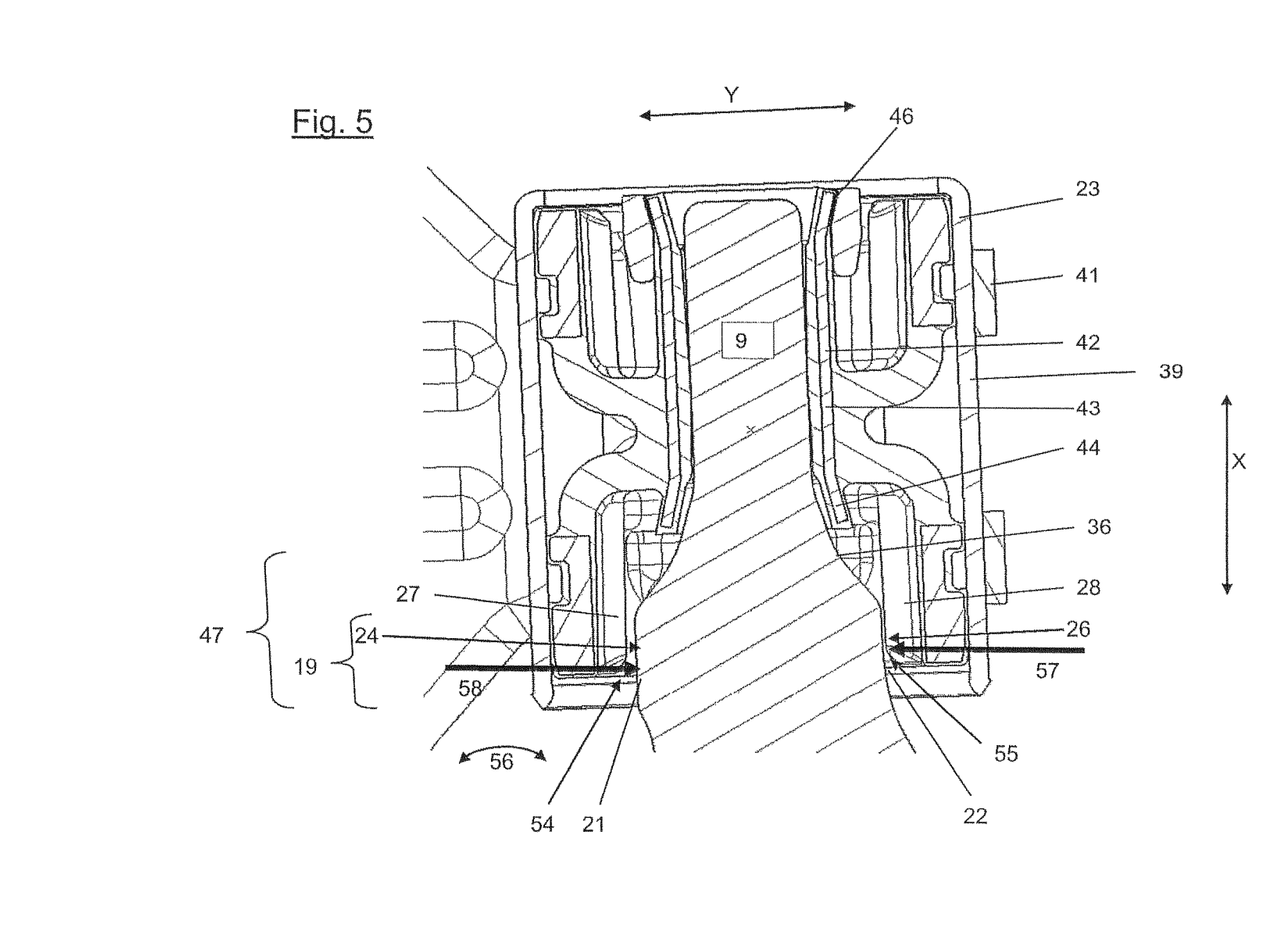
FIG. 5 shows a first fixing region of the transverse link in FIG. 1, the journal of which is accommodated in the bearing bush of FIG. 3, in longitudinal section.

FIG. 5 shows the transverse link 1, the journal 9 of which has been inserted into the bearing bush 23. The central section 43 of the inner tube 42 rests against the outer edges of the polygonal journal 9. The free end of the journal 9 ends approximately in the region of the end region 46 of the inner tube 42, within the outer shell 39.

The journal 9 merges into the stop region 19 via the transition 36. As is illustrated, the transition 36 is of substantially conical design, having a profile which arches slightly in the direction of the center line thereof, and the end region 44 of the inner tube 42 is also embodied with a corresponding opening angle.

The stop region 19 together with the thickened portions 21 and 22 thereof is overlapped by the overlapping region 47, with the result that the stop region 19 is arranged in a manner corresponding to the stop elements 27 and 28.

The stop elements 27 and 28, together with the thickened portions 21 and 22, are embodied in such a way that the air gaps 54 and 55 are formed in a neutral position of the transverse link 1 or the first fixing region 4 thereof and of the bearing bush 23. The neutral position is illustrated by way of example in FIG. 5. Air gap 54 can be made larger than, equal to or smaller than air gap 55, allowing more versatility in vehicle setup. As illustrated by way of example in FIG. 5, the air gap 54 illustrated on the left in the plane of the drawing is larger than the air gap 55 illustrated on the right in the plane of the drawing. However, this embodiment is given purely by way of example and is not intended to be restrictive, as indicated above. Thus, at least one air gap is formed when the sizes of the mutual opposites are equal, and two air gaps are formed when the sizes are different.

If the transverse link 1 or the first fixing region 4 now twists about the vertical axis Y relative to the bearing bush 23 in the second fixing region 3, the stop region 19 of the first fixing region 4 would shift relative to the bearing bush 23, within the latter, following a slight circular path in the plane of the drawing, i.e. either to the right or to the left in the plane of the drawing (arrows 56).

If the thickened portion 21 or 22 comes into contact with the stop element 27 or 28 during this process, only forces acting in the lateral and vertical directions are transmitted by virtue of the advantageous arrangement and configuration of the thickened portions 21 or 22 together with the stop elements 27 or 28, this being illustrated by way of example by means of arrows 57 and 58.

| List of reference signs: | |
|---|---|
| 1 | transverse link |
| 2 | main body |
| 3 | second fixing region |
| 4 | first fixing region |
| 5 | |
| 6 | third fixing region |
| 7 | frame limb |
| 8 | wheel limb |
| 9 | journal |
| 10 | |
| 11 | |
| 12 | socket |
| 13 | journal |
| 14 | base |
| 15 | |
| 16 | raised webs |
| 17 | H-profile |
| 18 | aperture |
| 19 | stop region |
| 20 | |
| 21 | thickened portion (inner) |
| 22 | thickened portion (outer) |
| 23 | bearing bush |
| 24 | stop surface of 21 |
| 25 | |
| 26 | stop surface of 22 |
| 27 | stop element on 23 |
| 28 | stop element on 23 |
| 29 | |
| 30 | |
| 31 | inner side |
| 32 | outer side |
| 33 | upper side |
| 34 | lower side |
| 35 | |
| 36 | transition from 19 to 9 |
| 37 | insertion end of 23 |
| 38 | side opposite 37 |
| 39 | outer shell |
| 40 | |
| 41 | clamp |
| 42 | inner tube |
| 43 | central section of 42 |
| 44 | end region of 42 |
| 45 | |
| 46 | end region of 42 |
| 47 | overlapping region |
| 48 | |
| 49 | recess |
| 50 | |
| 51 | stop surface |
| 52 | zenith |
| 53 | forging burr |
| 54 | air gap |
| 55 | air gap |
| 56 | double arrow |
| 57 | force arrow |
| 58 | force arrow |

The invention claimed is:

1. A transverse link having a main body (2), which has at least one first fixing region (4) for pivotal attachment to a vehicle frame element, the first fixing region (4) having a journal (9), which is surrounded by a bearing bush (23), which wherein said first fixing region further comprises
a stop region (19), which is interrupted when viewed in the circumferential direction, resulting in the formation of diametrically opposite thickened portions (21, 22), which are arranged between the main body (2) and the journal (9) and are embodied in such a way that only forces acting in the lateral and vertical directions are absorbed when the main body (2) is twisted out of the neutral position thereof, about a vertical axis (Y) of a second fixing region (3), and the respective thickened portion (21, 22) strikes against corresponding stop elements (27, 28) of the bearing bush (23) by means of respective stop surface (24, 26) thereof.

2. The transverse link as claimed in claim 1, wherein
the diametrically opposite thickened portions (21, 22) are arranged on side faces (31, 32) of the main body (2).

3. The transverse link as claimed in claim 1, wherein
the stop surfaces (26, 27) of the respective thickened portion (21, 22) are of cylindrical design.

4. The transverse link as claimed in claim 1, wherein
the first fixing region (4) has a transitional region (36) of conical design leading as a continuation from the stop region (19) to the journal (9).

5. The transverse link as claimed in claim 1, wherein
the bearing bush (23) is designed as a hydraulic bush.

6. The transverse link as claimed in claim 1, wherein
an insertion end (37) of the bearing bush (23) fits over the diametrically oppositely arranged thickened portions (21, 22), forming an overlapping region (47).

7. The transverse link as claimed in claim 1, wherein
the bearing bush (23) has, on an overlapping region (47) thereof, stop elements (27, 28) embodied and arranged in such a way as to correspond to the thickened portions (21, 22).

8. The transverse link as claimed in claim 1, further comprising
an inner tube (42), which ends at an insertion end (37) of the bearing bush (23) and within the latter, in a position ahead of an overlapping region (36) of said bush when viewed in an axial direction.

9. The transverse link as claimed in claim 1, which is formed from a light metal, preferably from aluminum.

10. The transverse link as claimed in claim 1, wherein the journal (9) has a polygonal cross section.

11. The transverse link as claimed in claim 1, wherein
the respective stop elements (27, 28) have a recess (49).

12. The transverse link as claimed in claim 1, wherein
each stop element (27, 28) or a stop surface thereof is oriented in a direction of a respective corresponding thickened portion (21, 22) in an assembled condition, at least one respective air gap (54, 55) being formed between each stop element (27, 28) and a respective thickened portion (21, 22) in a neutral position.

13. The transverse link as claimed in claim 1, wherein
the respective each stop element (27, 28) or a stop surface (51) thereof is oriented in a direction of a respective corresponding thickened portion (21, 22) in the assembled condition, air gaps (54, 55) of different sizes being formed between each stop element (27, 28) and a respective thickened portion (21, 22) in a neutral position.

\* \* \* \* \*